CATHODE-RAY DISPLAY SYSTEM HAVING ELECTROSTATIC MAGNIFYING LENS

Filed Nov. 13, 1958 2 Sheets-Sheet 1

INVENTOR.
Norman W. Parker
BY Mueller & Aichele
Attys.

CATHODE-RAY DISPLAY SYSTEM HAVING ELECTROSTATIC MAGNIFYING LENS

Filed Nov. 13, 1958 2 Sheets-Sheet 2

INVENTOR.
Norman W. Parker
BY Mueller & Aichele
Attys.

3,154,710

CATHODE-RAY DISPLAY SYSTEM HAVING ELECTROSTATIC MAGNIFYING LENS

Norman W. Parker, Wheaton, Ill., assignor to Motorola, Inc., Chicago, Ill., a corporation of Illinois Filed Nov. 13, 1958, Ser. No. 773,688
9 Claims. (Cl. 313—75)

This invention relates to cathode-ray display systems such as are used in television, radar and other applications, and more particularly to such a system wherein deflection of the cathode-ray beam is magnified so that a display of large size and desirable quality may be produced with low power consumption.

In television and radar display systems, a beam formed in a cathode-ray tube is deflected so that it sweeps or scans across a viewing screen to produce an image. The deflection of the beam requires a major portion of the power consumed by the display system. Naturally, the reduction of deflection power requirements is desirable from the general standpoint of economy, but there are some special factors which greatly amplify the importance of achieving such reduction. For instance, there has been a demand for increasingly compact television receivers which require shorter cathode-ray tubes. Such tubes call for wider deflection angles in order to provide a large picture, and to deflect a beam over such wide angles requires increased power. Higher voltage is also used in wide-angle tubes to produce a picture of the desired brightness, and this further increases the power needed for deflection.

Portable television receivers using transistors and a self-contained battery power supply have been proposed, and short wide-angle tubes must be employed to minimize the size and weight of such portable receivers. All of the deflection problems associated with wide-angle tubes become critical in the provision of a commercially acceptable portable television receiver because the power consumed by conventional tubes is beyond the capability of available batteries.

There have been efforts to provide a cathode-ray display system in which the beam is deflected over only a portion of the angle required to cover the viewing screen, and the deflection is then magnified by an electron lens to provide full coverage of the screen. It has been proved that low angle deflection coupled with scan magnification saves considerable power, and therefore a system of this type which will provide a display substantially equal in quality to that of a conventional system is clearly advantageous. Magnetic lenses which have been employed to provide the desired scan magnification must be carefully adjusted to compensate for deflection defocussing and to obtain the desired picture quality. Such magnetic lenses have been unsymmetrically and therefore have both a positive or converging effect and a negative or diverging effect on the beam. Although better picture quality should be obtainable with a radially symmetrical negative lens, no such lens has been available.

Accordingly, an object of the present invention is to provide a cathode-ray display system capable of producing a large image with minimum power consumption.

Another object is to provide a cathode-ray tube with a low power deflection and magnification system capable of producing a high quality image.

A further object of the invention is to provide a cathode-ray display system including a symmertical divergent electron lens which cooperates with deflection apparatus to produce scan magnification, and which has the same divergent magnifying effect in every radial direction.

A feature of the invention is the provision of a cathode-ray tube with an electrostatic magnifier lens for providing a radially symmetrical field within the tube between the viewing screen and the deflection system which has a divergent refractive effect on the cathode-ray beam and therefore magnifies the deflection.

Another feature of the invention is the provision in a cathode-ray tube of an electrostatic magnifier lens including a field terminating mesh which is transparent to the cathode-ray beam and which gives the lens field a symmetrical diverging effect.

A further feature is the provision of an electrostatic magnifier lens including a field terminating lens element of a double layer or double mesh construction such that undesirable secondary emission is suppressed.

Certain embodiments of the invention are illustrated in the accompanying drawings in which.

In practicing the invention, a cathode-ray tube is provided with a deflection system located between the electron source and the viewing screen of the tube, and a radially symmetrical, divergent electron lens located between the deflection system and the viewing screen. The electron lens includes a pair of tubular elements spaced coaxially along the central beam path, and a mesh element located between the tubular elements. The tubular elements are operated at a high potential and the mesh at a potential approaching ground. The mesh provides a field terminating electrode which divides the electrostatic field of the lens system into a decelerating portion followed by an accelerating portion, each having components acting radially outward from the central beam path such that the effect of the lens is to refract the beam and magnify its deflection. The tubular elements have a circular cross section so that the magnifying field is radially symmetrical, and if the beam is deflected in the horizontal and vertical directions to provide a television scan, the scan will be magnified equally in both directions. Accordingly, the power requirements of both the horizontal and vertical deflection systems are substantially reduced. The electrostatic lens forms a part of the electron-optics of the cathode-ray tube, and the elements thereof are coordinated to focus the beam on the viewing screen. The mesh is transparent to the electrons of the beam, and the mesh size is selected to minimize increase in spot size. A multiple stage lens of increased magnifying power may be provided by adding one or more meshes. Undesirable secondary emission from the field terminating electrode may be suppressed by using an electrode provided with two layers or a double mesh construction.

Figures 1, 2, 3, 4:
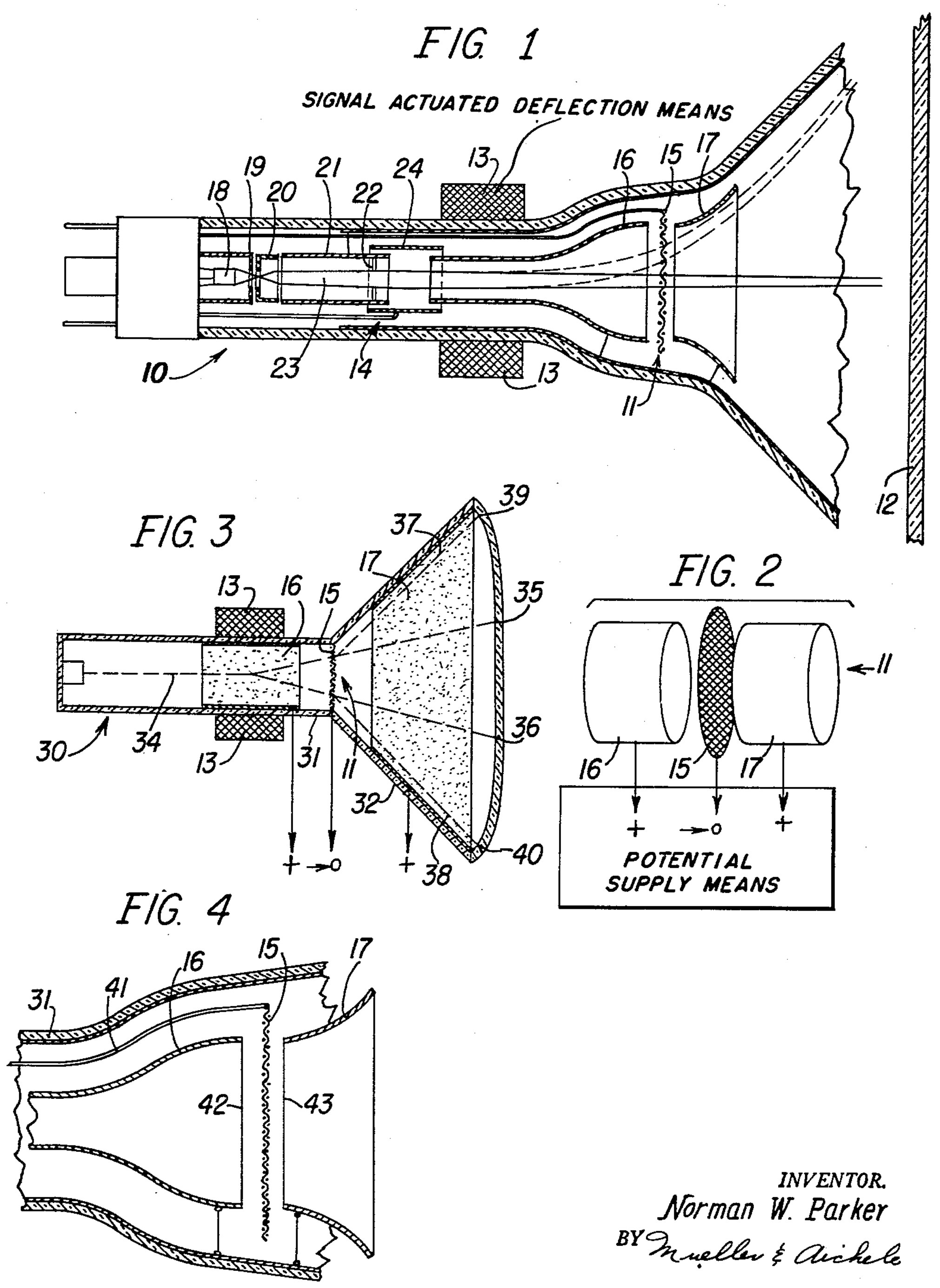
FIG. 1 shows a cathode-ray tube including a scan magnifier lens in accordance with the invention.
FIG. 2 shows an electrostatic lens including tubular and mesh elements which form the basic elements of the magnifying lens included in the tube of FIG. 1.
FIG. 3 shows the lens of FIG. 2 incorporated in a cathode-ray tube with the tubular elements being provided as coatings on the tube wall.
FIG. 4 is an enlarged fragmentary view showing the modified shape of the tubular lens element provided in the cathode-ray tube of FIG. 1.

Referring to the drawings, the cathode-ray tube 10 shown in FIG. 1 includes a scan magnifier lens, designated generally as 11, which is located between the screen 12 and the deflection coils 13. The magnifying lens 11 includes two tubular elements 16 and 17 spaced coaxially along the tube axis, and a mesh element 15 located between the tubular elements 16 and 17. The magnifying lens elements 15, 16 and 17 are incorporated into the electron gun structure designated generally as 14. The electron gun 14 also includes a cathode 18 which provides a source of electrons, a control grid 19 which draws the electrons away from the cathode and converges the electron beam to form a crossover as illustrated. The electron gun 14 also includes an accelerating electrode 21 with a limiting aperture 22, and a screen electrode 20 which cooperates with the accelerating electrode to collimate the beam emerging from the crossover. The cylindrical focussing electrode 24 provides a positive or convergent electron lens which has a sufficiently strong converging effect on the beam to compensate for the diverging effect of the magnifier lens 11 so that the beam is properly focussed on the screen 12. In the absence of deflection, the electron gun directs the cathode-ray beam 23 along the central tube axis, and the beam passes through the magnifying lens 11 and strikes the center of the screen 12. The deflection coils 13 (represented schematically) are energized by signal actuated sawtooth current waves to produce transverse fields in the path of the beam 23 so that it is deflected from its central path to an extent which in itself would produce only partial screen coverage. The magnifying lens 11 has a divergent effect upon the deflected beam and refracts it outwardly from the central beam path, so that after the beam emerges from the lens 11 it is fully deflected and will produce a full size image on the screen 12. Only a divergent lens will produce such outward refraction, and this divergent nature of the lens is sometimes referred to as a negative characteristic, and the lens may be defined as a negative lens.

The basic elements of the magnifying lens 11 are shown in FIG. 2. The combination of two tubular elements with a field terminating electrode between them as illustrated provides a radially symmetrical divergent electron lens which gives optimum scan magnification. The tubular lens elements 16 and 17 are operated at a high positive voltage, and the mesh element 15 is operated at a voltage approaching cathode potential or ground. Potentials are applied to the elements 15, 16 and 17 by any suitable potential supply means, as indicated in FIG. 2 of the drawing. For example, the tubular elements may be operated at about 15 kilovolts and the mesh element at about 1 kilovolt. So long as the ratio of tubular element potential to mesh potential is kept very high, the focal length of the lens 11 will be independent of accelerating voltages. Therefore, changes in accelerating voltages will not adversely affect spot focus.

In incorporating the lens 11 of FIG. 2 into a cathode-ray tube, it is possible to modify the construction of the lens elements in various respects. FIG. 3 is a schematic diagram of a cathode-ray tube 30 including an electrostatic magnifying lens 11 wherein the mesh element 15 is placed at the junction of the neck 31 and the flare 32 of the tube. The tubular elements 16 and 17 are respectively provided as conductive coatings on the wall of the neck portion 31 and the flare portion 32, and the mesh 15 has a diameter approximately equal to the diameter of the neck 31. High voltage is applied to the coatings 16 and 17, and the mesh 15 is operated near ground as previously explained. The deflection system 13 will deflect the beam from its central path 34 to such an extent that only the portion of the screen between points 35 and 36 would be covered if there were no magnification. The effective deflection center of the deflection system 13 is at the intersection of the lines 35 and 36. The magnifying lens 11 refracts the beam divergently with respect to the central path 34 to magnify the deflection as shown by the dotted lines 37 and 38 so that the full image is produced between points 39 and 40. Since the lens 11 is radially symmetrical, both horizontal and vertical deflection of a television scan will be magnified to the same extent. Thus, the schematic diagram of FIG. 3 represents both the horizontal and vertical magnification. The symmetry of the lens 11 also makes it suitable for magnification of other types of sweep patterns such as the circular sweep used in radar applications.

The construction of FIG. 3 requires that the leads which apply operating potentials to the lens elements be brought out through the wall of the tube, because if the connection to the mesh were made by a lead running back to the base of the tube it would have to go inside the tubular coating 16, and this would distort the magnifying lens fields. It is desirable to minimize the number of connections made through the tube wall, and this has been done by using a bell-shaped construction as illustrated in FIGS. 1 and 4. The tubular elements 16 and 17 are separated from the wall of the tube to provide clearance for the lead 41 outside of the tubular element 16 as illustrated. If it is desired to provide a mesh of a diameter as large as the diameter of the tube neck 31, the tube may be belled at the point where the magnifying lens is located, and the tubular elements 16 and 17 may be tapered. The element 16 is preferably given a bell shape and element 17 preferably is given a flared shape. The diameter of the openings of the tubular elements is about the same as the neck diameter and the mesh diameter may be slightly larger as illustrated. The flaring of element 17 ensures that the beam will not strike its trailing edge after magnification.

Figure 5:
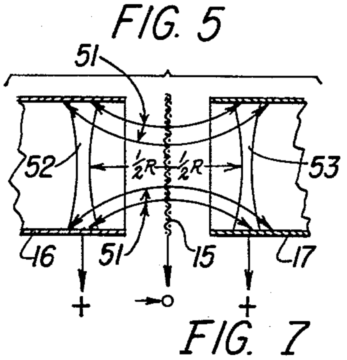
FIG. 5 illustrates the electron-optical effect of the magnifier lens of FIGS. 1–4.

The nature of the electrostatic fields produced by the lens 11 and the effect of these fields on the beam is illustrated in FIG. 5. It may be seen that the mesh element 15 termintes the field lines 51 so that the field is divided into two sections, one on either side of the mesh. Thus, the system may be considered as being composed of two sets of semi-lenses which both have a divergent effect as illustrated by the superimposed optical lenses 52 and 53. The first field section has a decelerating effect and the second field section has an accelerating effect on the beam. The focal length of each semi-lens may be calculated by the formula $$f=\frac{-3R}{1.32}$$

where R equals the radius of the tubular elements. The semi-lenses 52 and 53 are located at a distance one-half R on opposite sides of the mesh 15. The focal length of the composite lens may be calculated by the formula $F=.93R$. If the radius of the lens system R is the same as the radius of the tube neck, it may be calculated that the lens will provide a scan gain of about three times and a spot magnification of about eleven times. This results in a decrease in scan power of about 9:1.

Figure 6:
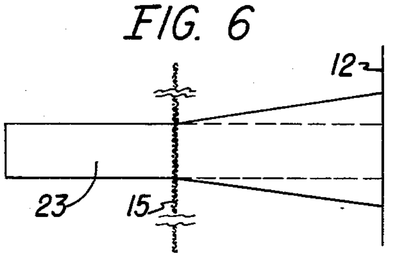
FIG. 6 illustrates the effect of the mesh element on spot size.

The effect of the mesh 15 on spot size is illustrated in FIG. 6. It will be understood that the proportions of the beam 23 and the mesh 15 are greatly exaggerated in this schematic diagram in order to clarify the description. As previously explained, the field terminating electrode of the magnifying lens should be transparent to electrons. However, the mesh 15 is an imperfect electron window, so there will be a certain amount of electron refraction near the edges of the mesh wires resulting in electron path errors in the projected mesh shadow. The effect of this refraction is illustrated by the spreading of the beam 23 after it passes through the mesh 15, and the result is a certain amount of increase in spot size. The increase in spot size may be held to a tolerable value by controlling the diameter of the mesh apertures, and it has been found that as the size of the mesh apertures is reduced, the spot magnification is decreased. A mesh size of 1000, which is a very fine mesh, should provide a satisfactory spot size.

Since the field terminating mesh is operated at low potential and the wires of the mesh are bombarded by the beam electrons, secondary emission may be produced by the electron impact. Secondary emission from the cathode side of the mesh will be drawn backwards toward the gun structure and the high voltage coating on the tube wall. The secondary emission which might enter the accelerating field on the viewing screen side of the mesh 15 may be suppressed by one of several methods.

Figure 7:
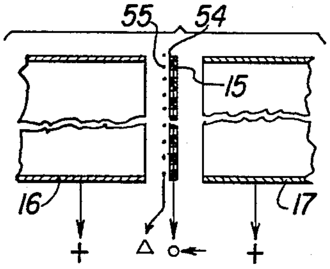
FIG. 7 shows an electrostatic magnifier lens including a double layer field terminating structure which reduces undesirable secondary emission.

For instance, as illustrated in FIG. 7, the mesh may be provided in the form of a finely apertured conductive layer 15 with an apertured masking coating 54 on the cathode side composed of an insulating material which has high secondary emission properties. It will be understood that the dimensions of the structure are exaggerated in FIG. 7, for actually the apertures in the structure are so small they are almost invisible. The masking coating 54 may be comprised of a vitreous enamel with magnesium oxide dusted on the outer surface. An open grid 55 positioned adjacent the insulating coating is held at a positive potential Δ slightly above that of the mesh, and this will establish the coating 54 at this slightly positive potential with respect to the mesh. The potential difference may be about 50–100 volts. When this double layer field terminating electrode structure is subjected to bombardment by electrons of the cathode-ray beam, secondary emission from the insulating layer 54 will be collected by the grid 55 and will build up a charge on the insulating layer which provides a steep negative going potential gradient across the thickness of the electrode structure. This gradient sets up an axial field which forms a barrier to secondary electrons emitted from the conductive layer or mesh 15.

Figure 8:
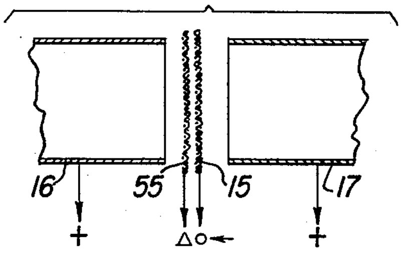
FIG. 8 shows an electrostatic magnifier lens employing a double mesh structure for reducing undesirable secondary emission.

In the lens of FIG. 8, the field terminating mesh 15 is preceded by another mesh 55 which is placed at a slightly higher positive potential Δ so that secondary emission is suppressed. The potential of mesh 55 may be 50–100 volts higher than the potential of mesh 15. Accordingly, the potential difference between the two electrodes 55 and 15 is small so that the overall lens fields are not distorted substantially.

Figure 9:
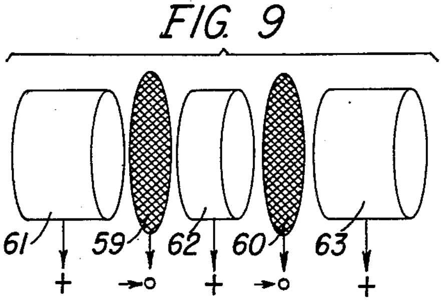
FIG. 9 shows a multi-stage electrostatic divergent lens employing two mesh elements.

FIG. 9 illustrates a multistage embodiment of the magnifying lens of the invention. In this embodiment, three coaxially spaced tubular elements 61, 62 and 63 are provided, and two mesh elements 59 and 60 are located between the tubular elements as illustrated. The tubular elements are all operated at high voltage, and the two mesh elements 59 and 60 are both operated near cathode potential or ground as previously explained. The mesh elements are each located on an equipotential plane in the lens field. With a multi-stage lens of this type it is possible to achieve greater magnification than with a single stage lens, but it is felt that the magnification obtainable with a single-stage lens will be sufficient for most applications.

It is apparent from the foregoing description that the invention provides a simple and practical deflection-magnification system for cathode-ray image reproducers. The radially symmetrical divergent electron lens of the invention provides sufficient magnification to produce a large size image with substantially reduced deflection power. The symmetry of the lens provides improved picture quality and permits application of the lens in systems using various sweep patterns.

I claim:

1. A cathode-ray tube having means for generating a cathode-ray beam and for directing the same along a predetermined path to a viewing screen for use in a display system which includes signal-actuated deflection means spaced from the viewing screen for establishing deflecting fields within the tube for scanning the beam, said tube including electrostatic magnifier lens means for producing within the tube an electrostatic field located between said deflection means and the viewing screen which is radially symmertical about the predetermined path of the beam, said magnifier lens means including a substantially flat field terminating electrode composed of finely apertured conductive material located in the path of the cathode-ray beam and transparent to the electrons thereof, first and second tubular electrodes positioned about the beam path between the deflection means and the viewing screen and on opposite sides of said flat field terminating electrode, and means applying potentials to said electrodes with the potentials applied to said tubular electrodes being a plurality of times greater than the potential applied to said field terminating electrode, said flat electrode dividing said electrostatic field into a decelerating portion and an accelerating portion so that the overall effect of said lens means is to refract the beam divergently with respect to the predetermined path and magnify the scan thereof.

2. In a display system which includes a cathode-ray tube having an electron gun for directing a cathode-ray beam along a predetermined path from an electron source to a viewing screen, and deflection means located between the electron source and the viewing screen for deflecting the beam from the predetermined path to scan the viewing screen, the combination including first and second tubular lens elements spaced coaxially along the predetermined beam path and located between the deflection means and the viewing screen, a mesh lens element located in the path of the cathode-ray beam between and adjacent to said first and second tubular lens elements, and potential supply means including means connected to apply high potential to said tubular lens elements and a low potential to said mesh lens element, said high potential applied to said tubular lens elements being a plurality of times greater than said low potential applied to said mesh lens element to establish within the tube radially symmetrical fields terminating at said mesh lens element and having components acting radially outward from the predetermined beam path, whereby the effect of such fields is to refract the beam outwardly from the predetermined beam path and magnify the scan thereof.

3. A cathode-ray tube having an electron gun for directing a cathode-ray beam along a predetermined path from an electron source to a viewing screen, and which is adapted for use with deflection means located between the electron source and the viewing screen for deflecting the beam from the predetermined path to scan the viewing screen, said tube including in combination, a first tubular lens element and a second flared tubular lens element spaced coaxially between the deflection means and the viewing screen and spaced from the tube wall, a conducting coating on the tube wall electrically connected to said tubular lens elements for applying potential thereto, a mesh lens element located in the path of the cathode-ray beam between said tubular lens elements, and electrical connector means extending between the wall of the tube and said first tubular element and connected to said mesh lens element for applying a potential thereto which is substantially less than the potential applied to said tubular lens elements, whereby said lens elements establish radially symmetrical fields terminating at said mesh lens element and having components acting radially outward from the predetermined beam path for refracting the beam and magnifying the scan thereof.

4. A cathode-ray tube having an electron gun for directing a cathode-ray beam along a predetermined path from an electron source to a viewing screen, and which is adapted for use with deflection means located between the electron source and the viewing screen for deflecting the beam from the predetermined path to scan the viewing screen, said tube including in combination, first and second tubular lens elements spaced coaxially along the predetermined beam path and located between the deflection means and the viewing screen, a finely apertured field terminating electrode located in the path of the cathode-ray beam between said first and second tubular lens elements, said electrode comprising a conductive element and a coating of insulating material having high secondary emission properties, means for applying potential to said tubular lens elements and said conductive element, and means for establishing a positive potential on said insulating coating with respect to said conductive element to collect secondary emission from said conductive element.

5. In a display system which includes a cathode-ray tube having an electron gun for directing a cathode-ray beam along a predetermined path from an electron source to a viewing screen, and deflection means located between the electron source and the viewing screen for deflecting the beam from the predetermined path to scan the viewing screen, the combination including first and second tubular lens elements spaced coaxially along the predetermined beam path and located between the deflection means and the viewing screen, a finely apertured field terminating electrode located in the path of the cathode-ray beam on an equipotential plane between said first and second tubular lens elements, said electrode comprising a conductive element and a coating of insulating material having high secondary emission properties, and grid means spaced from said insulating coating of said electrode in the direction of the electron source, potential supply means including means connected to said grid means and to said conductive element to apply a positive potential to said grid means for establishing a charge on said insulating coating at a potential slightly positive with respect to said conductive element so that secondary emission from said conductive element is collected, said potential supply means further including means connected to said tubular lens elements to apply thereto positive potential substantially greater than the potential on said grid means.

6. In a display system which includes a cathode-ray tube having an electron gun for directing a beam along a predetermined path from an electron source to a viewing screen, and deflection means located between the electron source and the viewing screen for deflecting the beam from the predetermined path to scan the viewing screen, the combination including first and second tubular lens elements spaced coaxially along the predetermined beam path and located between the deflection means and the viewing screen, a field terminating mesh located in the path of the cathode-ray beam between said first and second tubular lens elements, a suppressor mesh closely spaced from said field terminating mesh, potential supply means including means connected to said lens elements and said meshes to apply high potential to said tubular lens elements and low potential to said meshes, with the potential of said suppressor mesh being positive with respect to that of said field terminating mesh, said tubular elements cooperating with said mesh elements to establish within the tube radially symmetrical fields having components acting radially outward from the predetermined beam path for refracting the beam and magnifying the scan thereof.

7. A cathode-ray tube having an electron gun for directing a cathode-ray beam along a predetermined path from an electron source to a viewing screen, said tube being adapted for use with deflection means for establishing deflecting fields within the tube having an effective deflection center located between the electron source and the viewing screen for deflecting the beam to scan the same across the screen, said tube having a radially symmetrical lens structure providing a radially symmetrical divergent electron lens located between the position of the deflection center and the viewing screen and effective to magnify the scan of the beam, said lens structure including a substantially flat finely apertured mesh-like conducting electrode located in the path of the beam and being at least partially transparent to the electrons of the beam, first and second tubular conducting electrodes positioned on opposite sides of said flat conducting electrode and between the deflection center and the viewing screen, means applying potentials to said electrodes with the potentials applied to said tubular electrodes being substantially greater than the potential applied to said flat electrode so that each tubular electrode cooperates with said flat electrode to provide an effective divergent lens section, and means establishing focusing fields within the tube effective to compensate for the divergent effect of said electron lens on the beam and thereby focusing the beam on the viewing screen.

8. A cathode-ray tube which has a viewing screen and an electron source for directing a cathode-ray beam toward the viewing screen, and which is adapted for use with deflection means for establishing deflecting fields within the tube about an effective deflection center located between the electron source and viewing screen for deflecting the beam to scan the same over the screen, said tube including, electrostatic magnifier means providing a radially symmetrical divergent electron lens in position to magnify the scan, said magnifier means including first and second tubular means coaxial with the predetermined beam path and between the effective deflection center and the viewing screen, a substantially flat electrode of finely apertured construction extending between said tubular means transversely of the path of the beam and at least partially transparent to the beam, and means for supplying electrical potential to said tubular means and to said electrode for establishing said electrode at a substantially lower potential than said tubular means, each of said tubular means cooperating with said flat electrode to provide an effective divergent lens.

9. A cathode-ray tube which has a viewing screen and an electron source for directing a cathode-ray beam toward the viewing screen, and which is adapted for use with deflection means for establishing deflecting fields within the tube to scan the beam over the screen, said tube including in combination, focusing means associated with the electron source providing a positive electron lens for focusing the beam on the screen, a substantially flat, finely apertured mesh-like element of circular configuration extending transversely of the predetermined path of the beam and located between said focusing means and the viewing screen in a position to magnify the scan, first and second tubular means positioned between the deflection means and the viewing screen and on opposite sides of said mesh-like element, and means applying potentials to said tubular means substantially greater than the potential applied to said mesh-like element so that said tubular means cooperate with said mesh-like element and form therewith first and second radially symmetrical divergent electron lenses.

References Cited in the file of this patent

UNITED STATES PATENTS

| | | |
|---|---|---|
| 2,092,804 | Jobst | Sept. 14, 1937 |
| 2,225,455 | Klauer | Dec. 17, 1940 |
| 2,728,025 | Weimer | Dec. 20, 1955 |
| 2,892,962 | Ross | June 30, 1959 |

FOREIGN PATENTS

| | | |
|---|---|---|
| 237,488 | Switzerland | Aug. 16, 1945 |
| 473,675 | Great Britain | Oct. 18, 1937 |
| 553,466 | Great Britain | May 24, 1943 |
| 623,769 | Germany | Jan. 3, 1936 |
| 802,715 | France | June 13 1936 |